United States Patent [19]

Robillard

[11] 4,059,927
[45] Nov. 29, 1977

[54] GRINDING MACHINE

[75] Inventor: Edward G. Robillard, Cherry Valley, Mass.

[73] Assignee: Cincinnati Milacron-Heald Corporation, Worcester, Mass.

[21] Appl. No.: 718,900

[22] Filed: Aug. 30, 1976

[51] Int. Cl.² .......................................... B24B 49/10
[52] U.S. Cl. ............................ 51/165.77; 51/165.87
[58] Field of Search ........... 51/165 R, 165.77, 165.87, 51/165.88

[56] References Cited

U.S. PATENT DOCUMENTS

| 3,701,220 | 10/1972 | Wespi | 51/165.77 |
| 3,828,477 | 8/1974 | Sanford | 51/165.87 |
| 3,885,353 | 5/1975 | Ota | 51/165.87 |

Primary Examiner—Harold D. Whitehead
Attorney, Agent, or Firm—Norman S. Blodgett; Gerry A. Blodgett

[57] ABSTRACT

A grinding machine in which the grinding cycle is controlled by a stepping motor which receives pulses from a linear feed-controlled generator and which is operative to give an adjustable diamond clearance.

3 Claims, 17 Drawing Figures

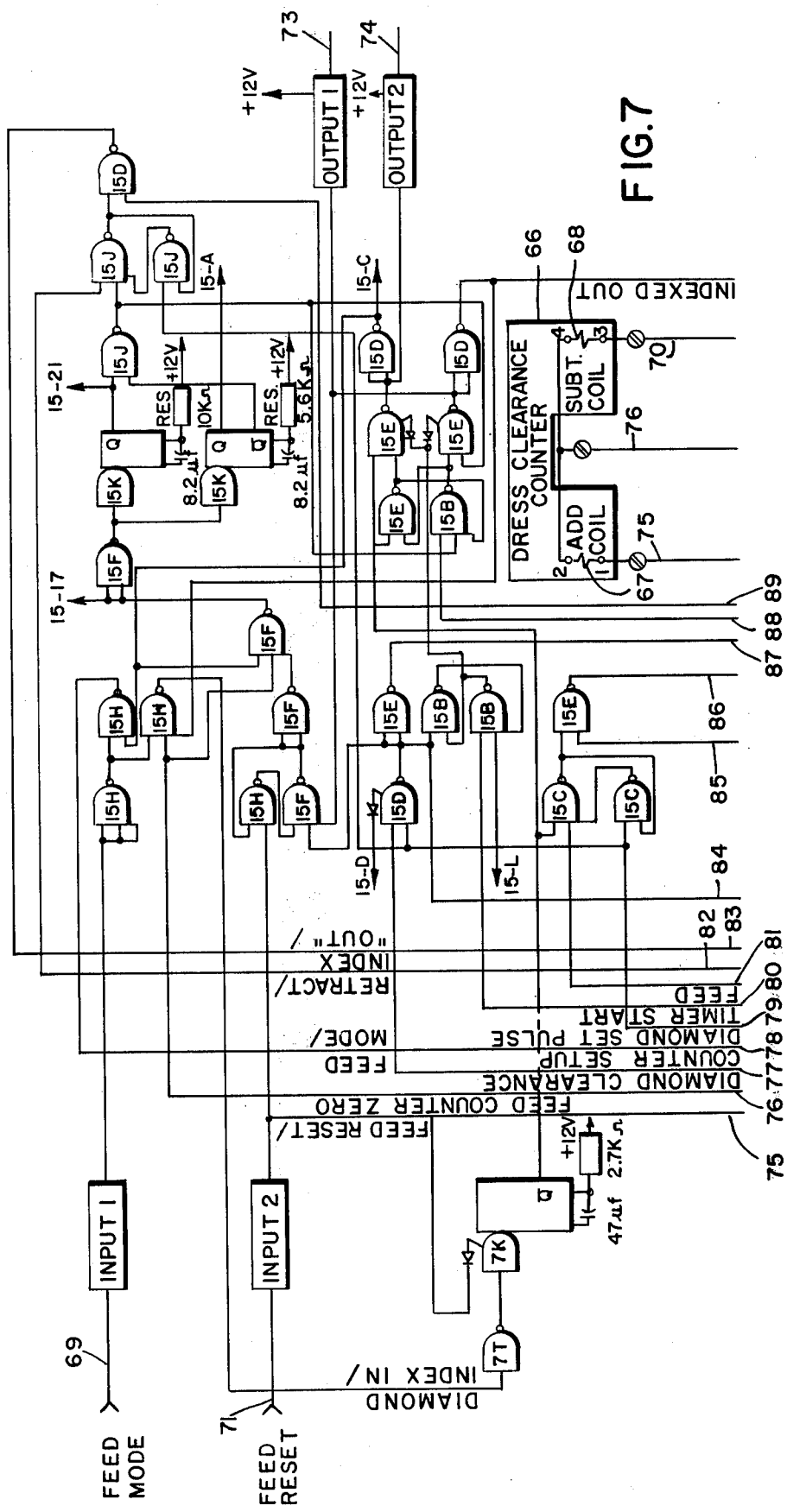

GRINDING MACHINE

BACKGROUND OF THE INVENTION

It has been common practice, particularly in the case of internal grinding machines, to operate the cross-feed portion of a grinding cycle by use of an electrical stepping motor which is energized by electrical pulses. The pulses are produced by a pulse generator and a control operates between the generator and the stepping motor to present the stepping motor with the pulses in various modes, frequencies, and amounts. This makes it possible to select from an almost endless variety of grinding cycles. Because the counting equipment available for counting the pulses is so reliable, it is possible to operate the grinding machine on the "dead reckoning" principle (as it is called in the art of the ocean navigation), rather than to take readings at certain intervals to determine the location of the grinding wheel relative to the workpiece. Such controls for the pulses have had some shortcomings however and one problem is that, when a setting of the feed rate is made on the face of the grinding machine, the setting device must consist of a warped potentiometer or a calibrated form of pulse-rate control. This is because in the past an equal change in resistance at the face of the control box results in a non-linear or exponential change in the frequency output of the generator. Another difficulty that has been experienced is that, as the diamond begins to wear, the fact that the infeed distance begins to change becomes troublesome. For instance, in an "interrupt to dress" cycle, the wheel is backed off from the workpiece far enough so that the wheel can pass over the diamond for a dress. After the dressing operation is finished, sufficient pulses are introduced into the grinding wheel to advance it into contact with the workpiece again for the finish grind. As the wheel wears, this advance or diamond clearance is too small and the wheel is liable to strike the workpiece while it is moving at a fairly rapid rate and can cause damage. Therefore, the ordinary operator must set up his "diamond clearance" or index large enough so that this will not happen even when the diamond wears. Such a large diamond clearance means that the machine converts to a slower rate of feed long before the wheel reaches the workpiece and this is a waste of machine time. These and other difficulties experienced with the prior art devices have been obviated in a novel manner by the present invention.

It is, therefore, an outstanding object of the invention to provide a grinding machine using the stepping motor feed in which the pulse rate and, therefore, the feed can be closely and easily controlled.

Another object of this invention is the provision of a grinding machine having an adjustable diamond clearance, which clearance is adjusted in accordance with the wear on the diamond.

A further object of the present invention is the provision of an internal grinding machine of the stepping-motor type in which the frequency of the electrical pulses presented to the stepping motor for feed and the number of such pulses presented for diamond clearance purposes are carefully regulated.

It is another object of the instant invention to provide a grinding machine whose grinding cycle over a large number of workpieces averages out to a lesser amount of time than in the prior art.

With these and other objects in view, as will be apparent to those skilled in the art, the invention resides in the combination of parts set forth in the specification and covered by the claims appended hereto.

SUMMARY OF THE INVENTION

In general, the invention consists of a grinding machine for generating a surface of revolution on a workpiece, which machine has a base with a workhead and a wheelhead mounted thereon for relative movement transversely of the axis of the surface of revolution. A stepping motor is operative to produce the said relative movement in response to the receipt of electrical pulses and a pulse generator is connected to the stepping motor to supply the said electrical pulses. A resistance unit is connected to the pulse generator to control the frequency of the pulses, the unit including an acutator movable in increments to connect equal increments of resistance to the generator, the said increments of resistance producing equal increments of frequency of pulses.

A dresser carrying a diamond is mounted on the workhead and means is provided for generating a signal indicative of wear on the diamond. Means is provided normally introducing a selected number of pulses to the feed means to produce an original diamond clearance movement between the workpiece and the abrasive wheel. Means is also provided for converting the signal indicative of wear to a series of pulses and adding them algebraically to the diamond clearance movement after each dressing operation to bring the dressed surface of the wheel to the same point relative to the workhead.

More specifically, a circuit is provided that reduces the pulse frequency to zero when an open circuit occurs in the resistance unit. A straight line relationship exists between the resistance in the resistant unit and the frequency of pulses emitted by the pulse generator. The means generating a signal indicative of wear is a gage which is operative on the surface of the workpiece. The means normally introducing a selected number of pulses to the feed means is a three-digit bi-directional electromechanical counter with an electrical readout of each digit. A WORN DIAMOND signal is generated when the result of the algebraic addition falls below a predetermined value and the machine is shut down.

BRIEF DESCRIPTION OF THE DRAWINGS

The character of the invention, may be best understood by reference to one of its structural forms, as illustrated by the accompanying drawings, in which:

FIGS. 7-15 are electrical circuit diagrams showing logic circuits forming part of the present invention.

DESCRIPTION OF THE PREFERRED EMBODIMENT

Figure 1:
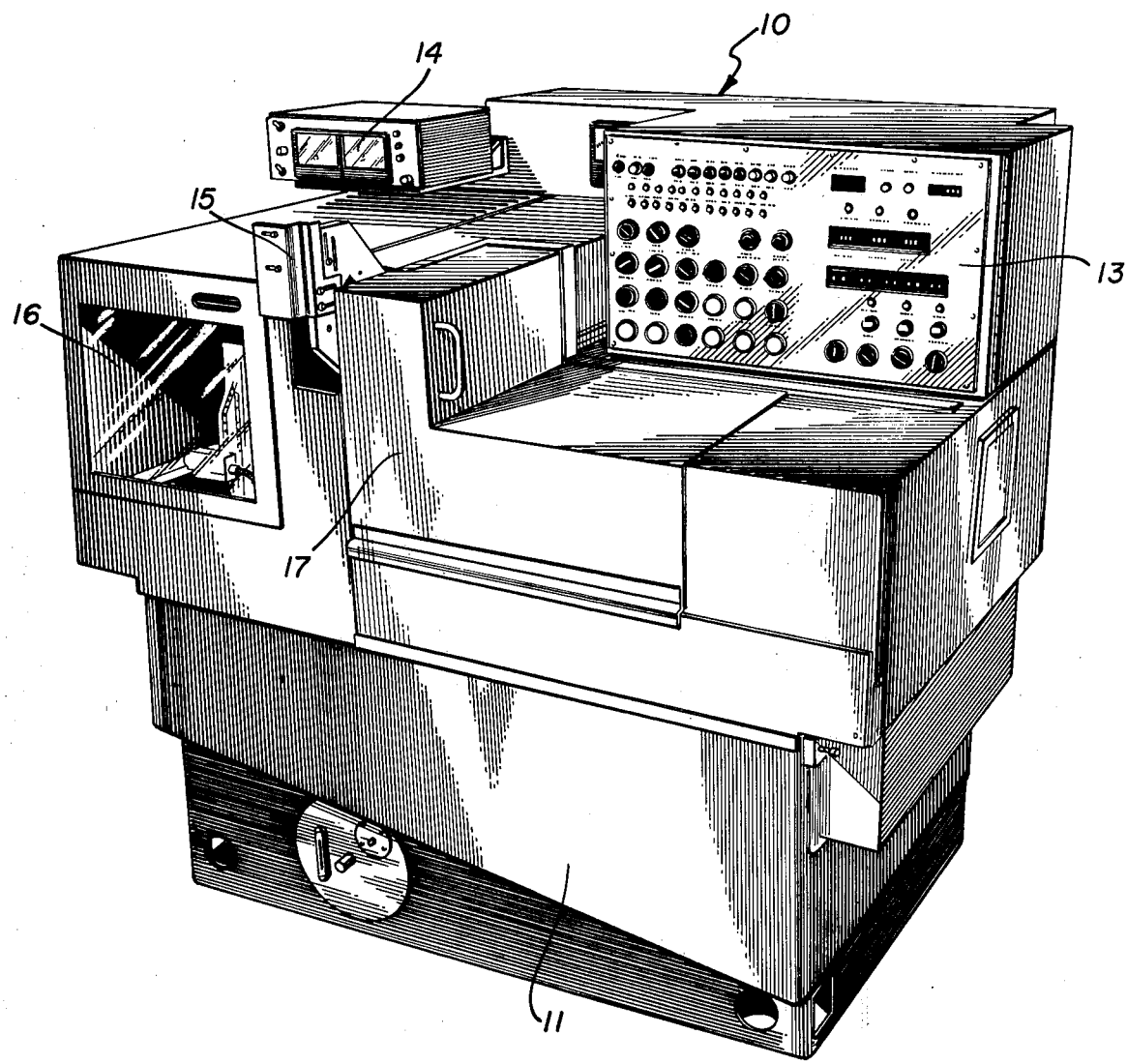
FIG. 1 is a perspective view of a grinding machine embodying the principles of the present invention.

Referring first to FIG. 1, which best shows the general features of the invention, the grinding machine, indicated generally by the reference numeral 10, is shown as being of the internal grinding type, which is shown and described in the patent application of Uhtenwoldt et al., Ser. No. 676,041 filed Apr. 12, 1976. The machine is provided with a housing 11 at the top of which is located a main control 13 and a size control 14. A loading mechanism 15 protrudes from the upper part of the housing and covers 16 and 17 cover the operating elements of the machine.

Figure 2:
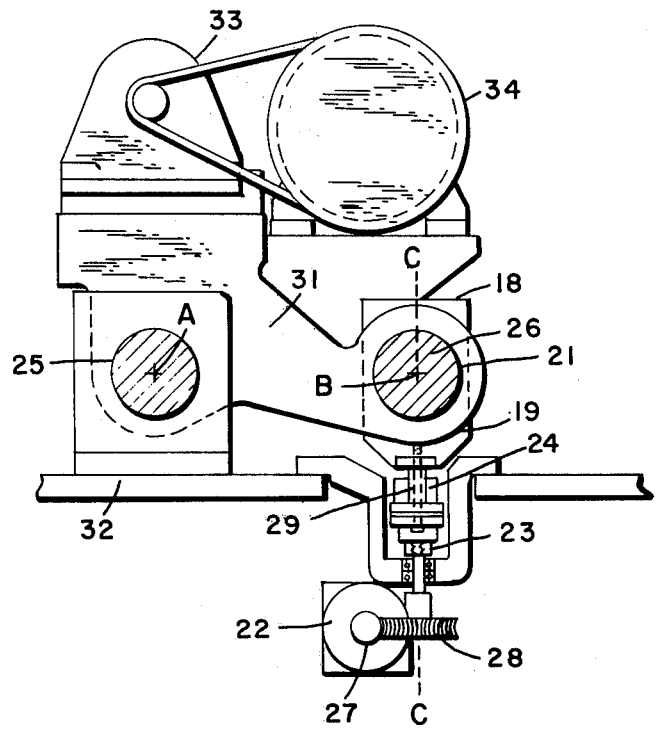
FIG. 2 is a transverse vertical sectional view of a portion of the machine.

FIG. 2 shows a feed mechanism 18 which includes a block 19 and a bearing 21 which are moved up and down vertically by a stepping motor 22. This motor is operated by means of a ball screw 23 and a nut 24, the axis of the ball screw being indicated by the line C—C in the drawing. This line C—C is perpendicular to a horizontal plane passing through the axes A—A of a primary bar 25 and B—B of a secondary bar 26. The block 19 with its bearing 21 (which is of the hydrostatic type) is mounted on the secondary bar 26. The stepping motor 22 has a worm 27 connected to its shaft, which worm, in turn, drives a worm gear 28. The ball screw 23 engages the nut 24 in the well-known manner and serves to move the block 19 vertically, thus carrying the secondary bar 26 with it. The block is attached to the nut by a connection 29 which is relatively narrow in cross-section at a location between the nut and the bearing to permit a slight bending to allow a slight angular misalignment of the block 19 relative to the ball screw 23 and the nut 24. This is necessary because of the fact that, as the wheelhead table 31 swings about the axis A—A of the primary bar 25, it carries the secondary bar with it. The axis B—B of the secondary bar moves in a broad arc and this means that the bar and the block also move slightly horizontally relative to the center line or axis C—C of the ball screw. This figure of the drawing also shows the wheelhead 33 mounted on the wheelhead table 31 and driven by an electric motor 34, all of the mechanism being mounted on a base 32 in the usual way.

Figure 3:
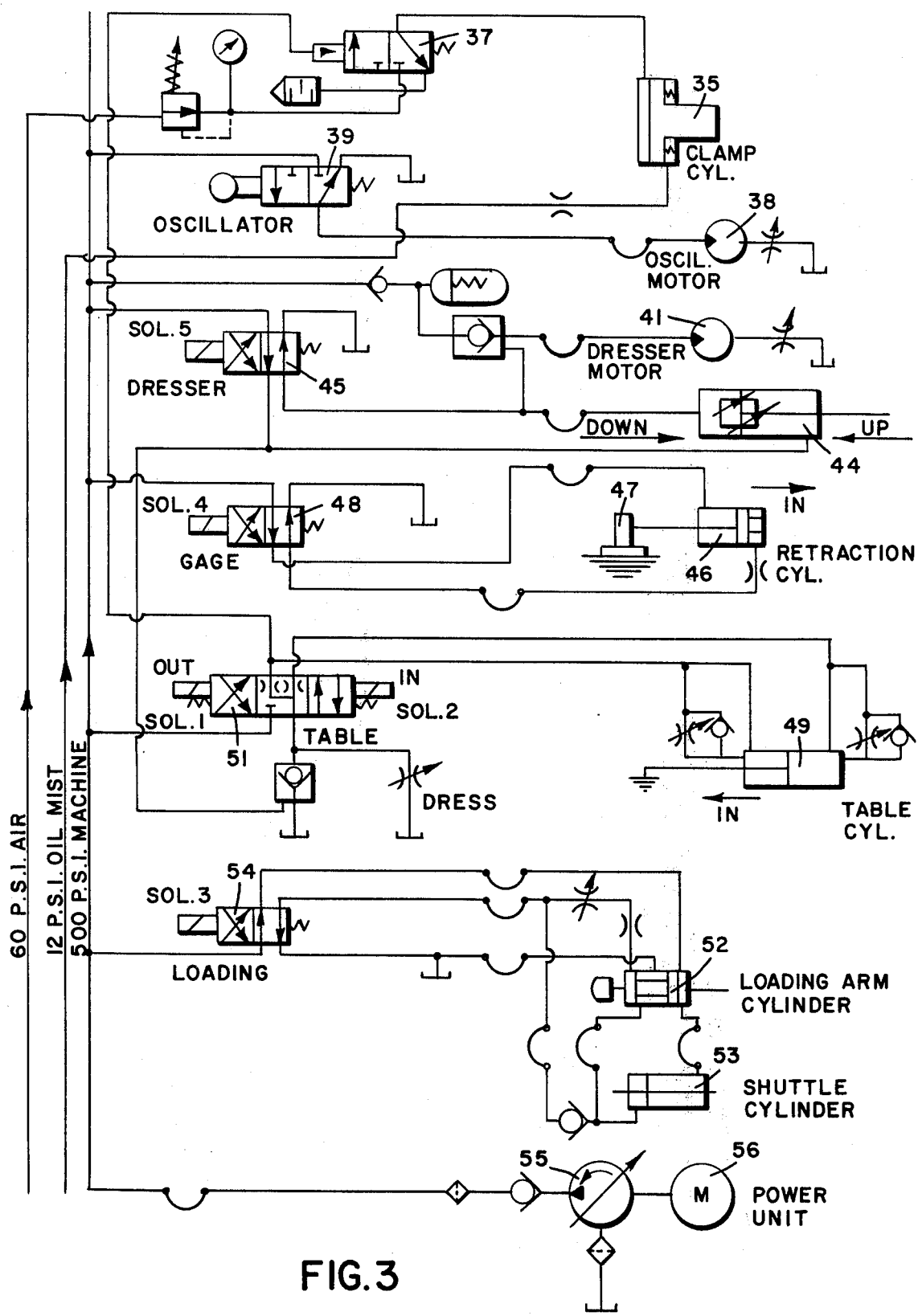
FIG. 3 is a hydraulic schematic showing the main operating cylinders and solenoid valves in the machine.

Referring next to FIG. 3, it can be seen that the grinding machine is provided with a number of hydraulic cylinders and with valves for controlling the cylinders in a more-or-less conventional manner. A CLAMPING cylinder 35 operates a clamp for the workpiece 43 (FIG. 6) and is controlled by a solenoid valve 37. A hydraulic motor 38 operates an oscillator and is controlled by a solenoid valve 39. A hydraulic motor 41 serves to operate a dresser 42 (FIG. 6) which is normally mounted on the workhead table (not shown). A DRESSER cylinder 44 serves to move the dresser up and down from operative to inoperative position. The movement of the cylinder 44 as well as the actuation of the DRESSER motor 41 is controlled by a solenoid valve 45. A RETRACTION cylinder 46 serves to withdraw a gage 47 from the work on occasion and its operation is controlled by a solenoid valve 48. A TABLE cylinder 49 is built into the primary bar 22 (not shown in this view) and serves to move that bar (along with the table 31) longitudinally of the axis A—A. The cylinder 49 is controlled by a solenoid valve 51. A LOADING ARM cylinder 52 and a SHUTTLE cylinder 53 operates as part of the loading mechanism 15 (FIG. 1) in a conventional manner to introduce unfinished workpieces into the work area and to remove finished workpieces. These last two cylinders are controlled by a solenoid valve 54. A pump 55 driven by a motor 56 is shown as supplying the hydraulic system with pressure fluid for most of the cylinders. A separate air source is connected to the CLAMPING cylinder 35 for unclamping the workpiece and a low pressure source of oil mist is also connected to that cylinder for lubrication purposes.

Figure 4:
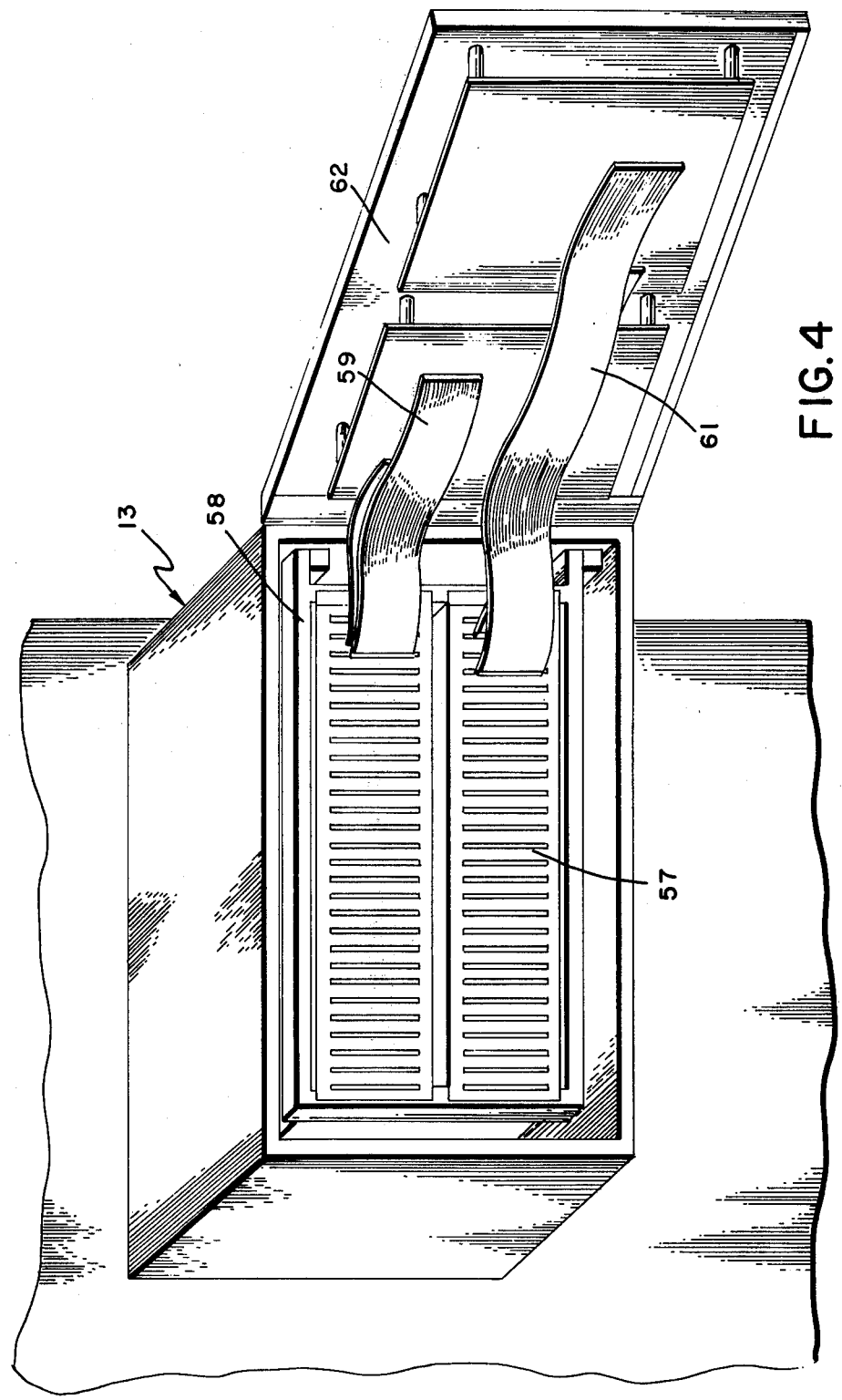
FIG. 4 is a perspective view of the control box with the front open to show the logic circuit boards.

FIG. 4 shows the manner in which the main control 13 consists of a plurality of printed circuit boards 57 mounted vertically in a housing 58. These boards are connected by ribbon cables 59 and 61 to a door 62, which is hingedly mounted along one side to the housing 58 and which carries the display elements shown in FIG. 1.

Figure 6:
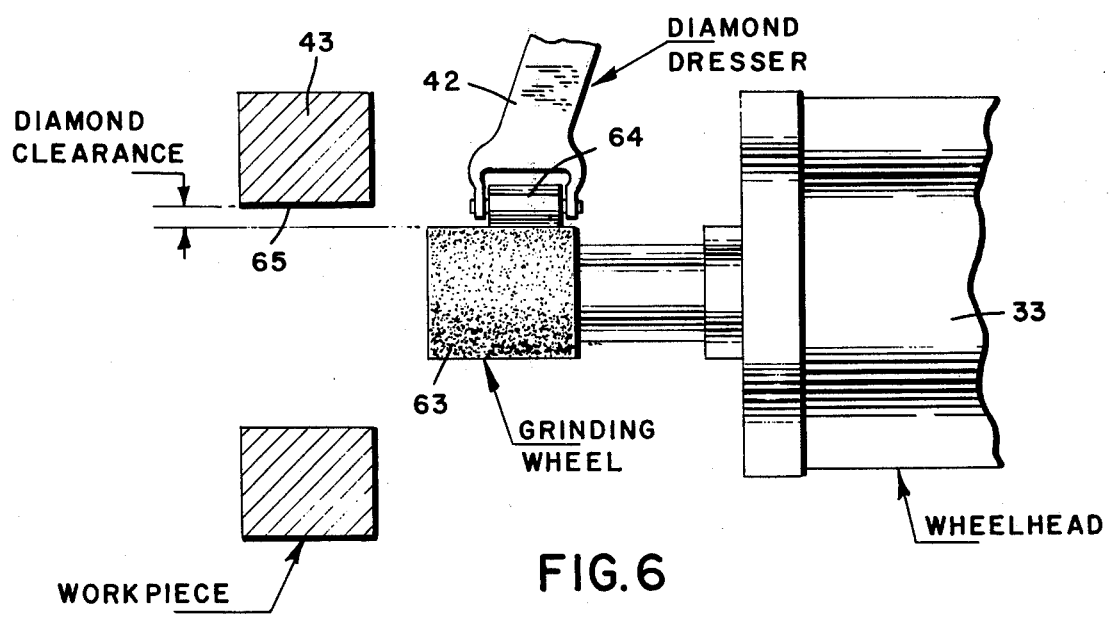
FIG. 6 is a diagrammatic view of the relationship between the grinding wheel, the workpiece, and the diamond dresser in the present invention.

FIG. 6 shows in a very general way the interrelation during the grinding operation of the workpiece 43 with a grinding wheel 63 mounted on the wheelhead 33 and their relationship to the dresser 42. This view shows, particularly well, the so-called "diamond clearance" which is the distance between the operative line of the dresser, such as the surface of a diamond wheel 64, and the surface 65 of the workpiece 43. The surface 45 which is to be finished by the grinding operation is a surface of revolution and in the drawing is shown as being cylindrical. While the dresser 42 is shown as having a diamond wheel 64 driven by the motor 41 (FIG. 3) for the purposes of description, it will be understood that the dressing can take place by use of a single-point diamond. In either case it is capable of being moved from operative to inoperative position by the DRESSER cylinder 44. Although the movement of the abrasive wheel relative to the diamond and the workpiece is performed by the mechanical apparatus shown in FIG. 2, nevertheless, the feeding originates in the stepping motor 22 which, in turn, is controlled by the main control 13. This main control is largely made up of logic circuitry of the type shown in the patent of Robillard U.S. Pat. No. 3,867,794 which issued on Feb. 25, 1975 to which reference may be made for details. Certain additions and substitutions are made to the circuitry shown in this last-named patent and these changes are the subject of the present invention. For that reason, FIGS. 9–17 show various aspects of the circuitry which will be useful in describing and showing the present invention. Because of the difficulty of placing all of the circuitry on one sheet of drawings, suitable reference numerals have been provided for showing the interconnection of the electrical lines in one figure of the drawings to those of another.

Figure 8:
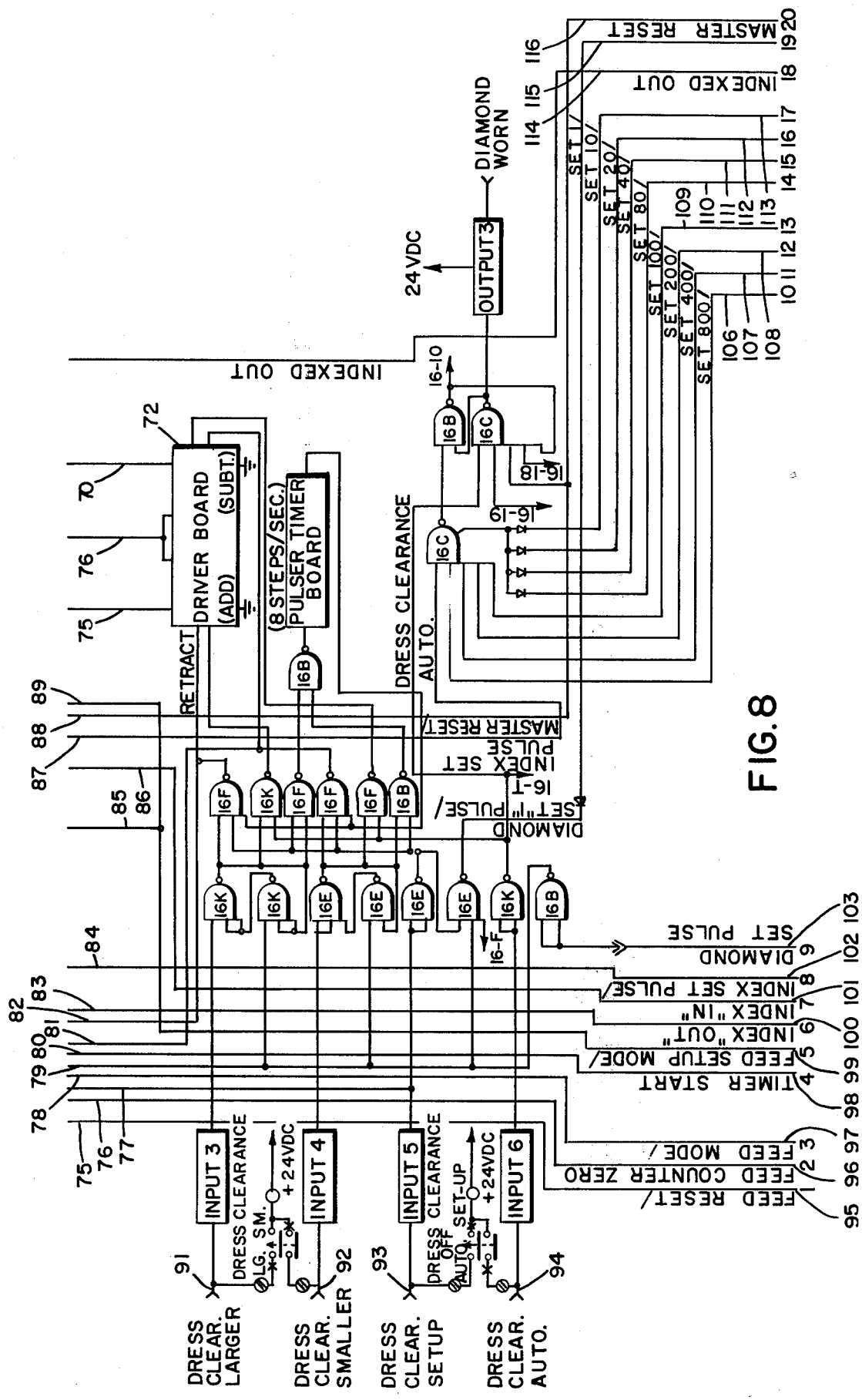

In FIG. 7 is shown electrical circuitry which contains a DRESS CLEARANCE counter 66, containing an ADD coil 67, and a SUBTRACT coil 68. A FEED MODE line 69 enters the circuitry, as well as a FEED RESET line 71. The DRESS CLEARANCE counter 66 is a three-digit, bi-directional, electro-mechanical counter with an electrical readout of each digit. The coils 67 and 68 receive their operating pulses from a DRIVER board 72 (FIG. 8). An OUTPUT 1 line 73 and OUTPUT 2 line 74 are connected to corresponding lines in FIG. 9. Signal lines 75 and 76 leading from the DRESS CLEARANCE counter 66 are connected to corresponding lines in FIG. 8 and, therefore, to the DRIVER board 72. Lines 75–89 are connected to correspondingly-numbered lines in FIG. 8.

Entering FIG. 8 are DRESS CLEARANCE LARGER line 91, DRESS CLEARANCE

SMALLER line 92, DRESS CLEARANCE SET-UP line 93, and DRESS CLEARANCE AUTO line 94. These operate through the DRIVER board 72 and through the lines 75, 76, and 70 to operate the DRESS CLEARANCE counter 66. Also entering the circuit in FIG. 8 is a FEED RESET line 95, a FEED COUNTER 0 line 96, and a FEED MODE line 97. Also entering the circuit in FIG. 8 is a TIMER START line 98, a FEED SET-UP MODE line 99, an INDEX OUT line 100, an INDEX IN line 101, an INDEX SET PULSE line 102, and a DIAMOND SET PULSE line 103. As has been mentioned above, the line 70, as well as the line 75 and 76 and the line 75–89 are connected to the circuitry of FIG. 7. Included also in the circuitry of FIG. 8 is a PULSER TIMER board 104 and a RE-DIAMOND WORN OUTPUT line 105. Extending from the circuitry as output lines is a SET 800 line 106, a SET 400 line 107, a SET 200 line 108, a SET 100 line 109, a SET 80 line 110, a SET 40 line 111, a SET 20 line 112, and a SET 10 line 113, an INDEXED OUT line 114, a SET 1 line 115, and a MASTER RESET line 116.

Figure 9:
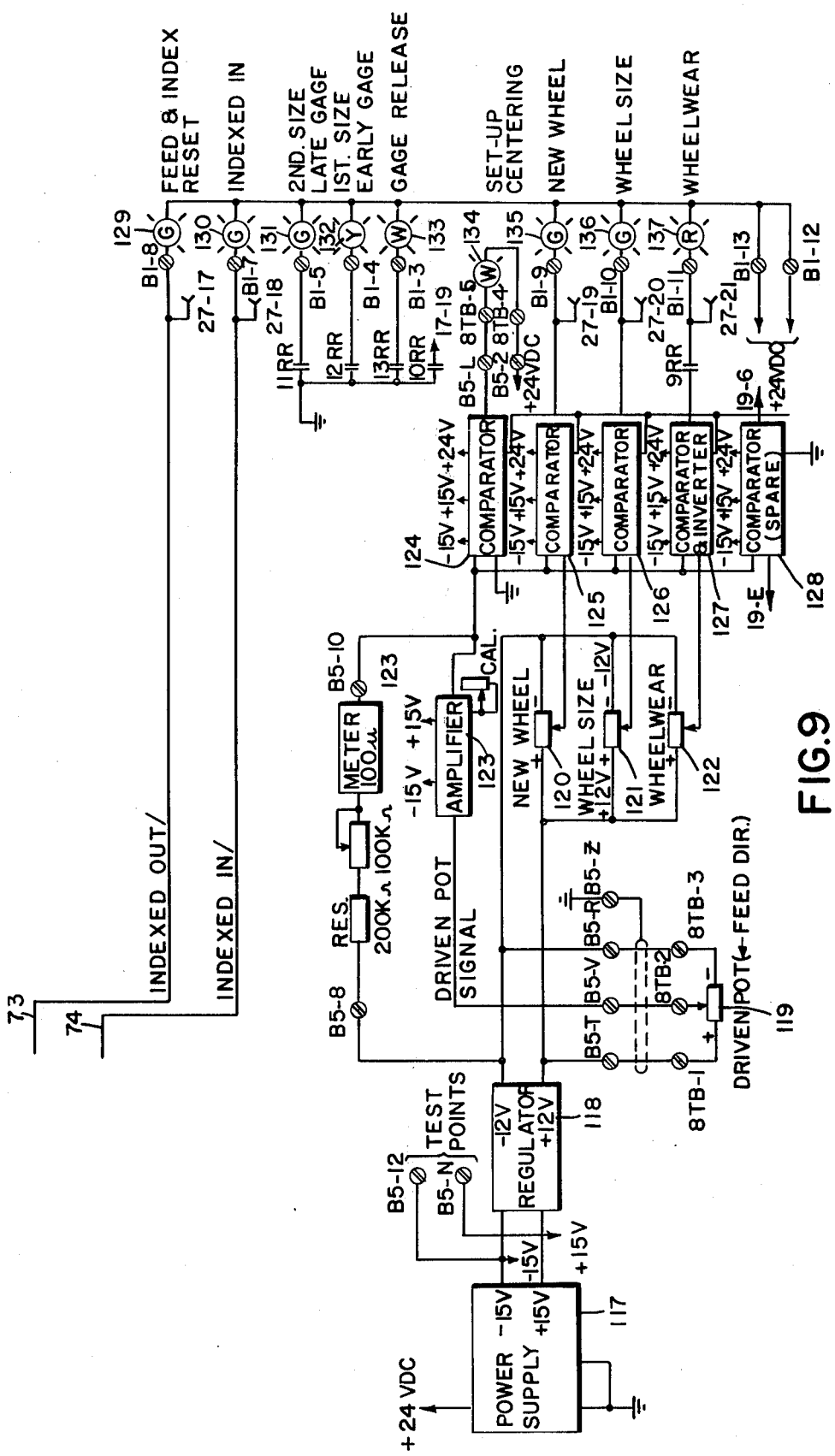

In FIG. 9 the input lines are shown consisting of INDEXED OUT line 73 and INDEXED IN line 74. Located in this circuit is a dual 15-volt power supply 117 connected to a voltage regulator 118. Included in the circuitry is a DRIVEN potentiometer 119, a NEW WHEEL potentiometer 120, a WHEEL SIZE potentiometer 121, and a WHEEL WEAR potentiometer 122. The circuit includes a digital readout including a meter 122. An amplifier 123 receives the signal from the potentiometer 119. The outputs of the potentiometers 120, 121, and 122, as well as the output of the amplifier 123, are fed into comparators 124–128 and their outputs are connected to other parts of the circuit, as will be described. The INDEXED OUT line 73 is connected to a FEED AND INDEXED RESET lamp 129. The INDEXED IN line 74 is connected to an INDEXED IN lamp 130. Also included in the circuit is a SECOND SIZE/LATE GAGE lamp 131, a FIRST SIZE/EARLY GAGE lamp 132, and a GAGE RELEASE lamp 133. The comparator 124 is connected to a SET-UP CENTERING lamp 134. The comparator 125 is connected to a NEW WHEEL lamp 135. The comparator 126 is connected to a WHEEL SIZE lamp 136. The comparator 127 is connected to a WHEEL WEAR lamp 137. These lamps 129–137 are all located on the door 62 of the main control 13 (see FIG. 1).

Figure 10:
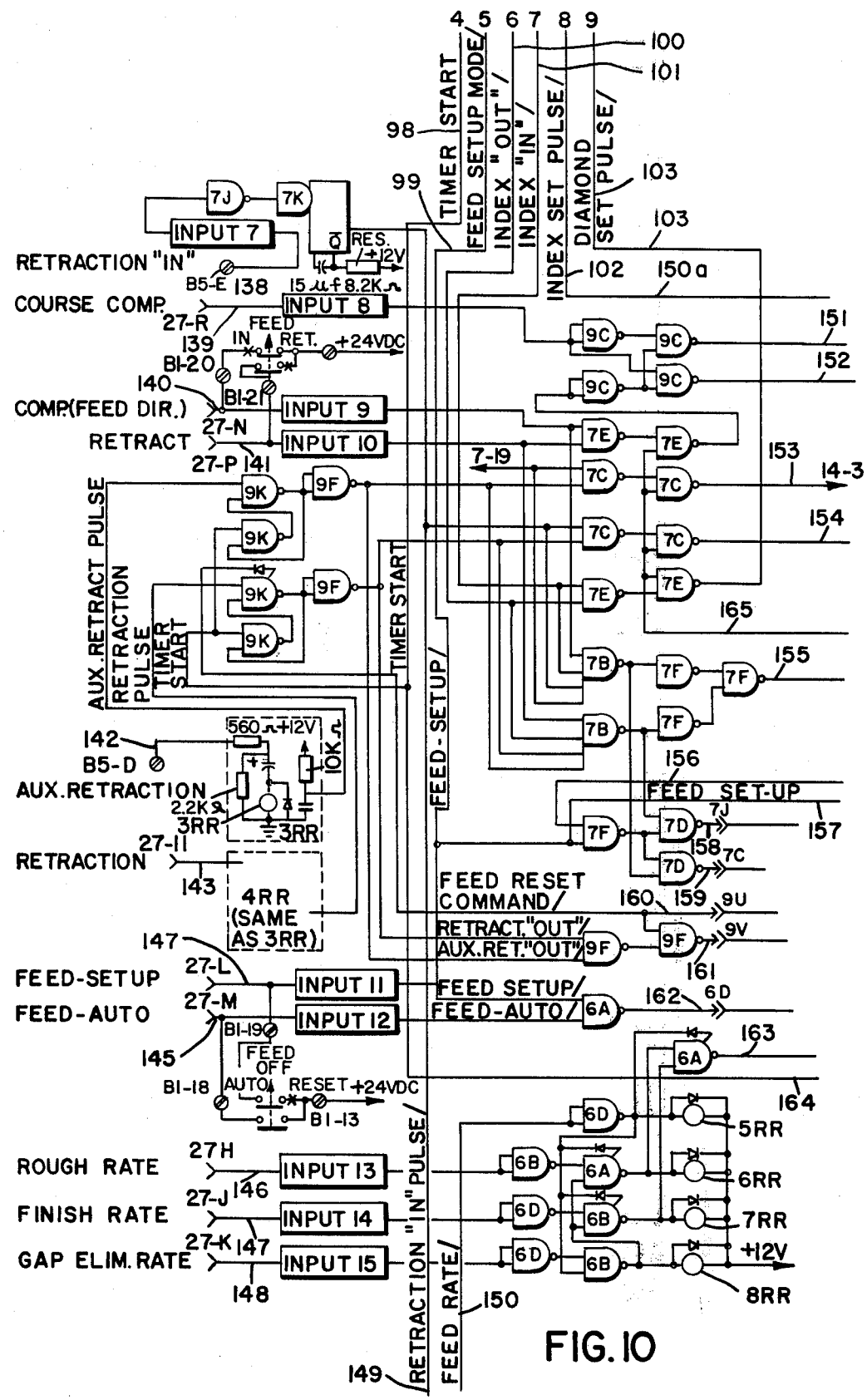

Referring now to FIG. 10, a set of input lines, including the lines 98–103, are connected to the corresponding lines in the circuit of FIG. 8. The circuit includes a RETRACTION IN line 138 and a COARSE COMPENSATION line 139, as well as a COMPENSATION (FEED DIRECTION) line 140, as well as a RETRACT line 141. Also entering the circuit is an AUXILIARY RETRACTION line 142, a RETRACTION line 143, a FEED SET-UP line 144, a FEED AUTOMATIC line 145. Also entering the circuit is a ROUGH RATE line 146, a FINISH RATE line 147, and a GAP ELIMINATOR RATE line 148. Connected into the circuit is a RETRACTION "IN" PULSE line 149 and a FEED RATE line 150. Lines 150–164 are connected to correspondingly numbered lines in the circuit of FIG. 11. Line 165 is also connected to a similar numbered line in FIG. 11. Also included in the circuit of FIG. 10 are the operating coils of relays 3RR, 4RR, 5RR, 6RR, 7RR, and 8RR.

Figure 11:
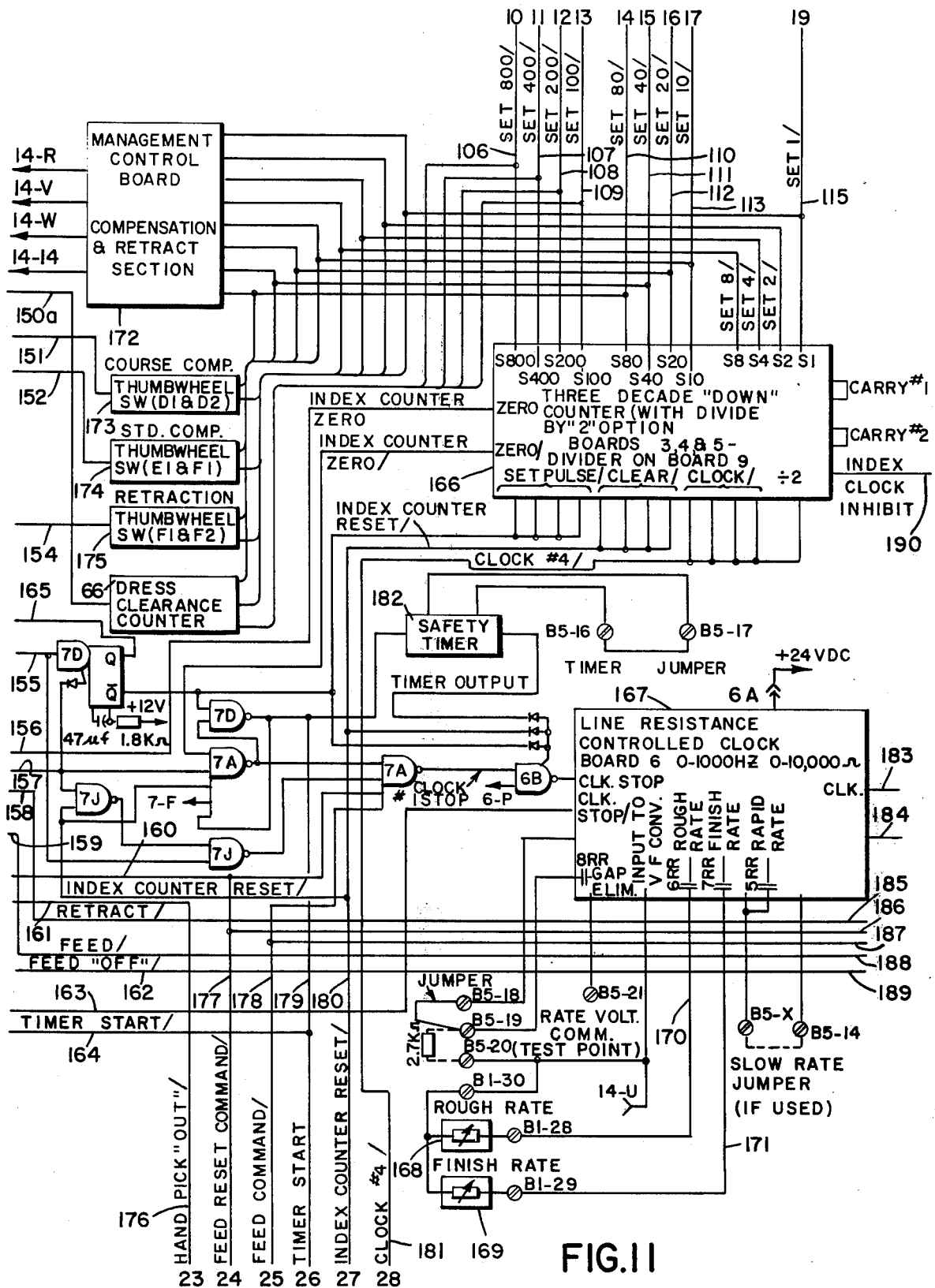

In FIG. 11 the DRESS CLEARANCE counter 66 is shown again in a different setting and is shown as connected to a three decade down-counter 166. Also included in the circuitry is a linear-resistance-controlled clock 167. A ROUGH RATE digiswitch 168 and a FINISH RATE digiswitch 169 are shown as connected to the counter through line 170 and 171, respectively. A printed circuit board 172 is shown as containing a MANAGEMENT CONTROL function, as well as a COMPENSATION AND RETRACTION section. The lines 150–165 are shown as entering the circuitry of FIG. 11 from the circuitry of FIG. 10. The line 150a is connected to the DRESS CLEARANCE counter 66. Line 161 is connected to a COARSE COMPENSATION thumb-wheel switch 173. Line 152 is connected to a STANDARD COMPENSATION thumb-wheel switch 174, while the line 154 is connected to a RETRACTION thumb-wheel switch 175. At the upper part of the drawing can be seen the lines 106–113 and line 115 which are connected to similarly-numbered lines in the circuit of FIG. 8. Extending from the circuitry of FIG. 11 are a HANDPICK "OUT" line 176, a FEED RESET COMMAND line 177, a FEED COMMAND line 178, a TIMER START line 179, an INDEX COUNTER RESET line 180, and a CLOCK #4 line 181. Also included in the circuit is a SAFETY timer 182. Extending out of the circuit are lines 183–189 which connect to correspondingly-numbered lines in FIG. 12. Also line 190 extends from the circuitry into the circuitry of FIG. 12.

Figure 12:
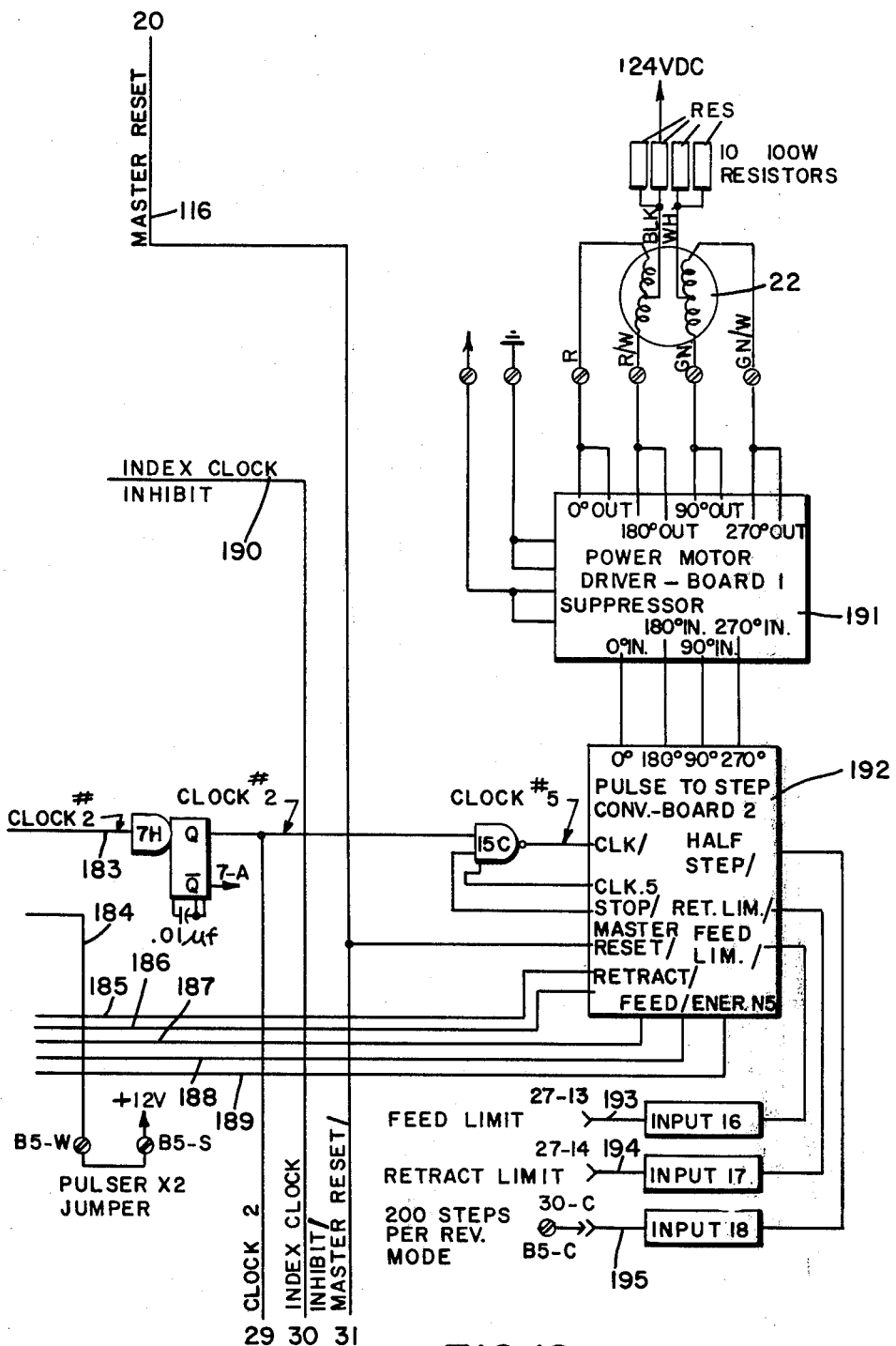

FIG. 12 shows the stepping motor 22 and associated equipment. A DRIVER board 191 connected to the motor and back to a PULSE-TO-STEP CONVERTER board 192. Into the circuit of FIG. 12 enters the MASTER RESET line 116 from the circuit of FIG. 8, as well as the lines 183–190 from the circuit of FIG. 11. Into the circuit also extends a FEED LIMIT line 193, a RETRACT limit line 194, and a 200-STEPS-PER-REVOLUTION MODE line 195. Leaving the circuit is a CLOCK #2 line 196, an INDEX CLOCK INHIBIT line 197, and a MASTER RESET line 198.

Figure 13:
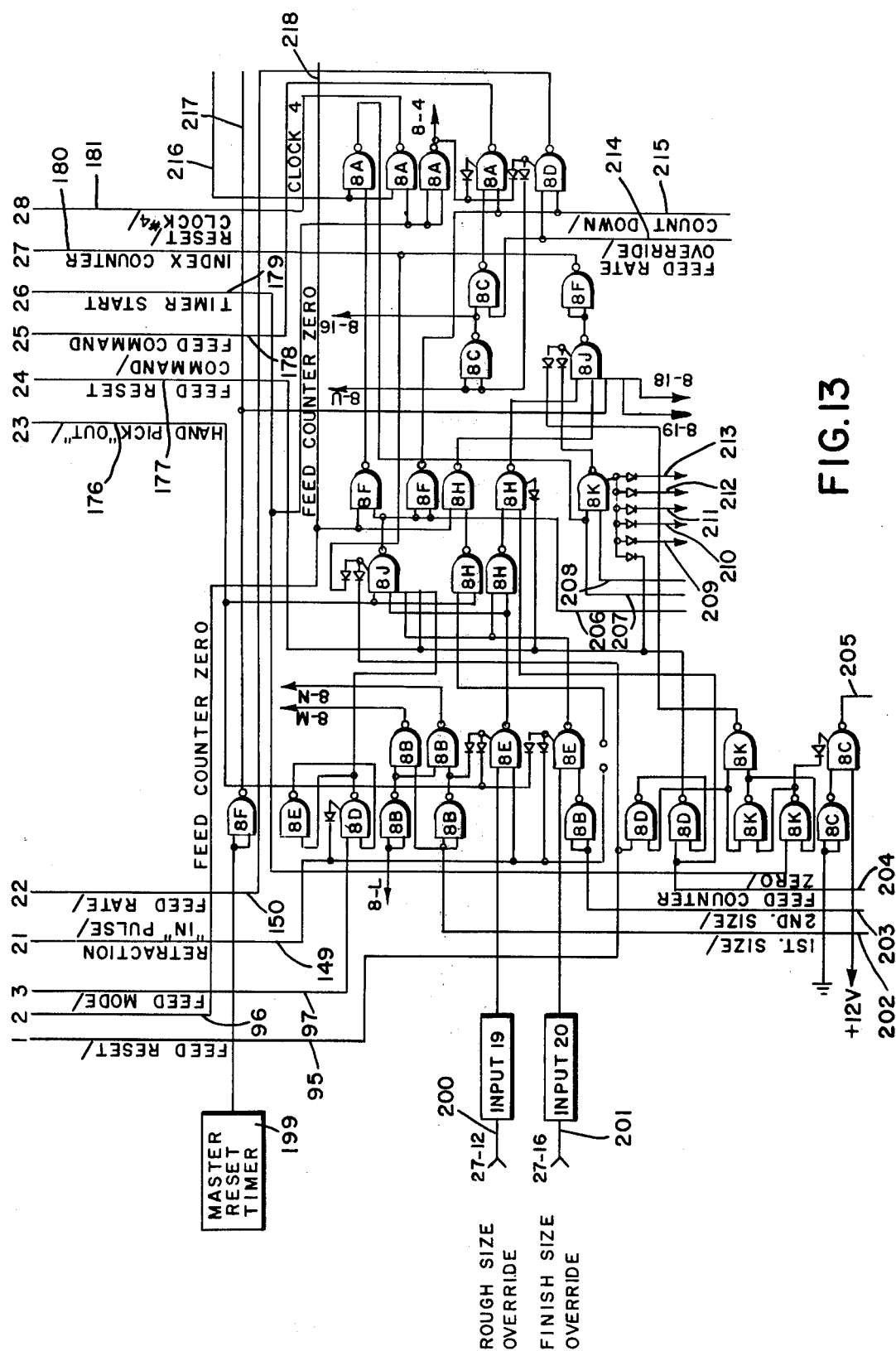

FIG. 13 shows a MASTER RESET timer 199 and entering the circuit a ROUGH SIZE OVERRIDE line 200, and a FINISH SIZE OVERRIDE line 201. Entering the circuit from the circuit of FIG. 8 are the FEED RESET line 95, the FEED COUNTER 0 line 96, and the FEED MODE line 97. Entering the circuit from the circuit of FIG. 10 is the RETRACTION "IN" PULSE line 149, and the FEED RATE line 150. Entering the circuit from the circuit of FIG. 11 is the HAND-PICK "OUT" line 176, the FEED RESET COMMAND line 177, the FEED COMMAND line 178, the TIMER START line 179, the INDEX COUNTER RESET line 180, and the CLOCK #4 line 181.

Figure 14:
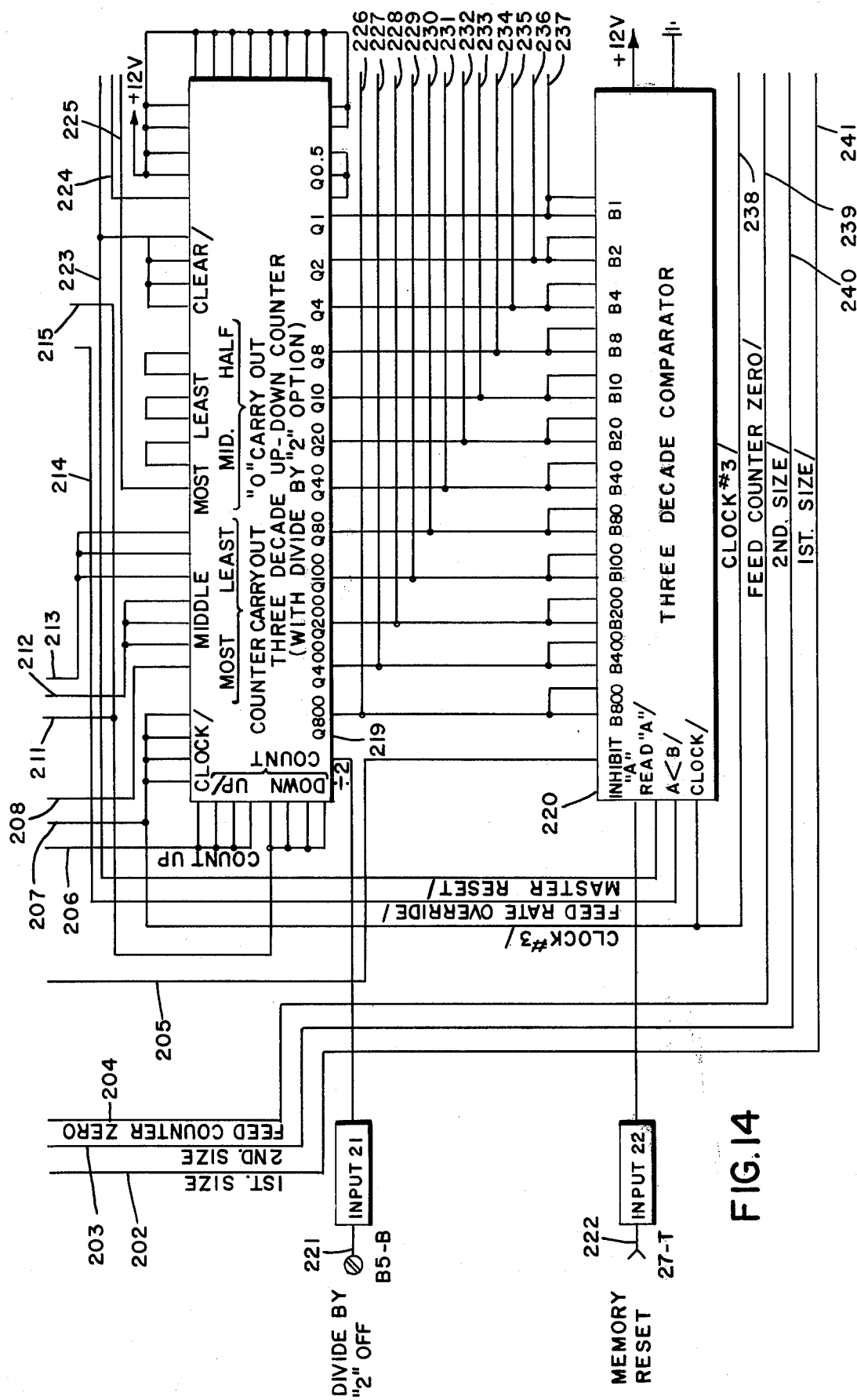

Leaving the circuit of FIG. 13 and entering the circuit of FIG. 14 are lines 202–208 and 211–215. Leaving the circuit of FIG. 13 and connected to correspondingly numbered lines in the circuit of FIG. 15 are the lines 216, 217, and 218.

FIG. 14 contains a THREE-DECADE UP-DOWN COUNTER board 219 and a THREE-DECADE COMPARATOR BOARD 220. Entering the circuit is a DIVIDE BY "2" OFF line 221 and a MEMORY RESET line 222. As has been stated above, lines 202–208 and lines 211–215 enter the circuit of FIG. 14 from the circuit of FIG. 13. Connecting the circuit of FIG. 14 to the circuit of FIG. 15, are lines 223 through 241.

Figure 15:
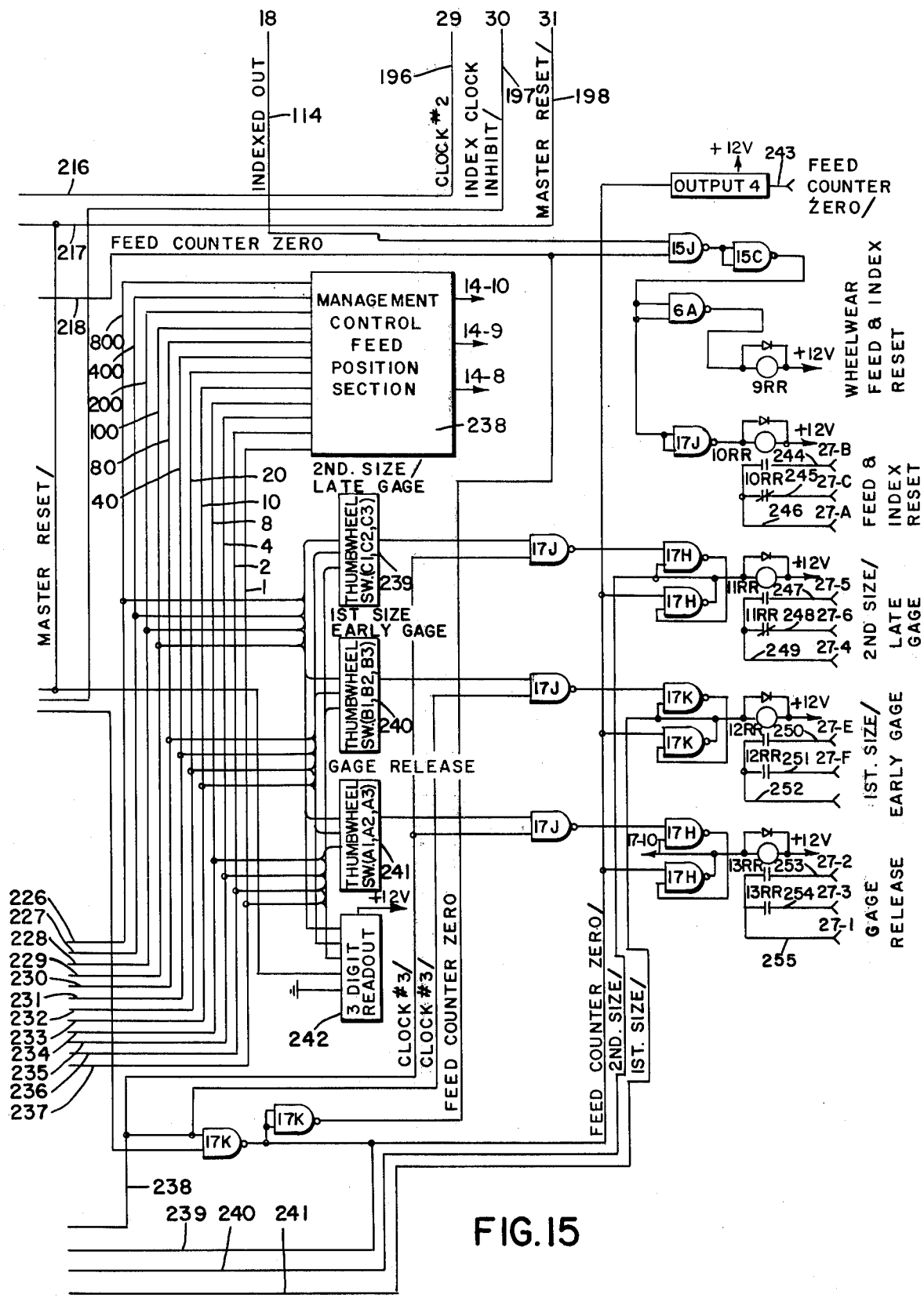

Referring now to FIG. 15, it can be seen that the circuit includes a MANAGEMENT CONTROL board 238 containing a FEED POSITION section. It also includes a SECOND SIZE/LATE GAGE thumbwheel switch 239, a FIRST SIZE/EARLY GAGE thumb-wheel switch 240, a GAGE RELEASE thumbwheel switch 241, and a three-digit readout 242. Entering the circuit of FIG. 15 from the circuit of FIG. 13 are the lines 216, 217, 218, as well as lines 223-241. Also entering the circuit from the circuit of FIG. 8, is the INDEXED OUT line 114. Entering the circuit from the circuit of FIG. 12 are the CLOCK #2 line 196, the INDEX CLOCK INHIBIT line 197 and the MASTER RESET line 198. Leaving the circuit is a FEED COUNTER ZERO line 243, FEED AND INDEX RESET lines 244, 245, and 246, SECOND SIZE/LATE GAGE lines 247, 248, and 249, FIRST SIZE/EARLY GAGE lines 250, 251, and 252, and GAGE RELEASE lines 253, 254, and 255. Also carried in this circuit are the coils of relays 9RR, 10RR, 11RR, 12RR, and 13RR.

Figure 16:
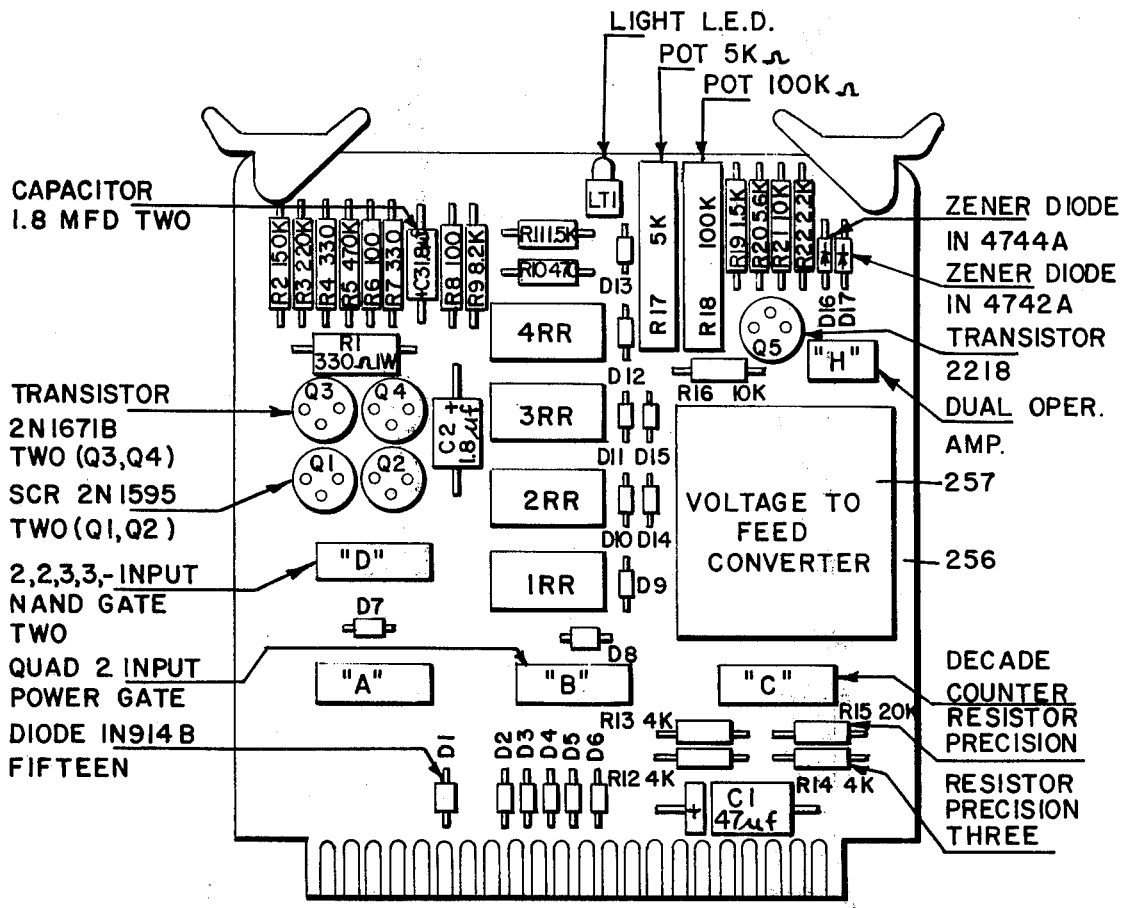
FIG. 16 is a front elevational view of a printed circuit board used in the machine.

Referring next to FIG. 16, which shows a PULSER TIMER board 256, it is shown as carrying reed relays 1RR, 2RR, 3RR, and 4RR, as well as a voltage-to-frequency converter 257.

Figure 17:
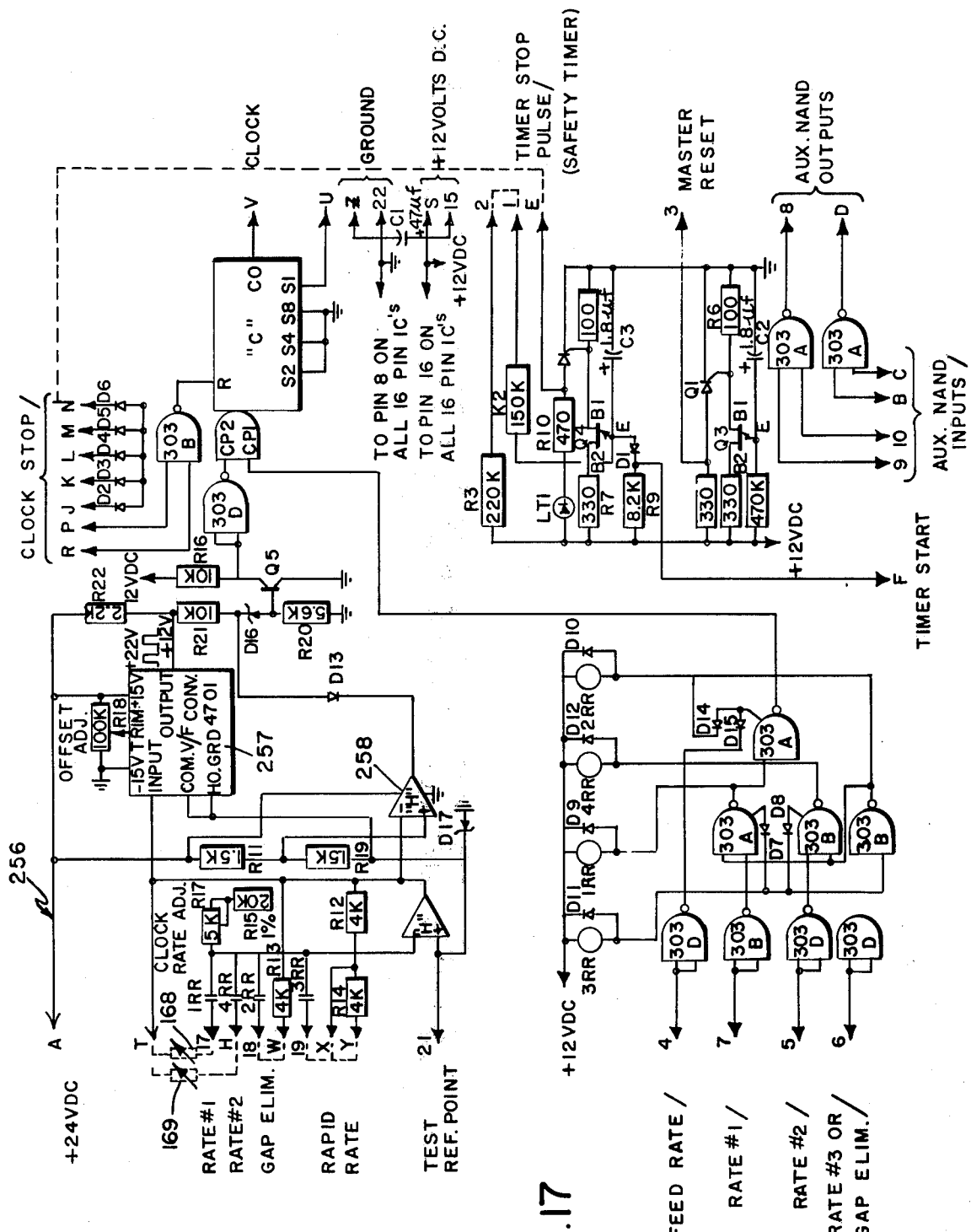
FIG. 17 is an electrical schematic diagram of the circuitry carried on the printed circuit board of FIG. 16.

FIG. 17 is a schematic showing the electrical circuitry used on the board 256. The circuit includes a dual operational amplifier 258 which, if the voltage on an input connection goes above a preset reference (junction of R-11 and R-19) it shorts out the OUTPUT PULSE from 257, STOPPING THE CLOCK.

It can be seen, then, that the grinding machine 10 is intended for generating a surface of revolution 65 on a workpiece 43. The machine is provided with a base 32 on which are mounted a workhead carrying the workpiece 43 and a wheelhead 33 carrying the abrasive wheel 63. The workhead and the wheelhead are mounted on the base for relative movement longitudinally and transversely of the axis of the surface of revolution 65. A stepping motor 22 is operative to produce the said transverse relative movement in the response to the arrival of electrical pulses from the driver board 191. A pulse generator in the form of the clock 167 is connected to the stepping motor 22 to supply the said electrical pulses by way of the pulse-to-step converter board 192. Resistance units 168 and 169 connected to the PULSE GENERATOR clock 167 serve to control the frequency of the pulses. The selector digi-switches 168 and 169 each include an actuator which is movable in physical increments to connect equal increments of resistance to the clock 167. The said increments of resistance produce equal increments of frequency of the pulses emitted from the clock. The operational amplifier 258 (FIG. 17) provides a circuit which reduces the pulse frequency to "zero" when an open circuit accidentally incurs in the resistance units, thus preventing the machine from "running away". A circuitry provides a straight-line relationship between the amount of resistance connected in the resistance units 168 and 169 and the frequency of the pulses emitted by the clock 167 for the operation of the stepping motor. The units 168 and 169 are commercially available thumb-wheel digital switches associated with a plurality of fixed resistances.

It is clear also that a dresser 42 is provided, carrying a dressing element 68 which is mounted on a portion of the machine which is not subject to transverse motion relative to the workhead and the workpiece 43. Means is provided for generating a signal indicative of the location of the operative surface of the dresser, this means consisting of the gage 47 and the measuring mechanism to determine whether the workpiece reaches FINAL SIZE before or after a predetermined time. The signals indicative of this fact are impressed on the lines 91 and 92 (in FIG. 8) to operate the DRESS CLEARANCE counter 66. A means consisting of the counter 168 serves to introduce a selected number of pulses to the stepping motor 22 to produce an original DIAMOND CLEARANCE movement between the workpiece and the abrasive wheel, while the DIAMOND CLEARANCE counter 66 serves to convert the signal on the lines 91 and 92 to a series of pulses and adding them algebraically to the selected number of pulses in the original diamond clearance, so that the DIAMOND CLEARANCE movement serves to bring the dressed surface of the wheel 63 to the same point relative to the workpiece 43 after each dressing operation. The means generating the signal is the gage 47 which operates on the surface 65 of the workpiece 43 during the grinding operation and, particularly, during the finish portion thereof. The counter 166, which introduces a selected number of pulses to the feed means for grinding, is a three-digit, bi-directional electro-mechanical counter with an electrical readout of each digit. A diode board is attached to the counter 66 to convert the three-digit readout to a three-digit BCD readout. A WORN DIAMOND signal is generated, when the results of the algebraic addition falls below a predetermined value. This serves to illuminate the WHEEL WEAR lamp 137, and it also acts to shut down the grinding machine.

The operation of the grinding machine will now be readily understood in view of the above description. The movement of the grinding wheel 63 relative to the workpiece 43 and its surface 65 which is to be finished takes place in the present embodiment of the machine entirely by movement of the wheelhead 33. The workhead on which the workpiece 43 is mounted is maintained in a fixed position. The motion of the wheelhead 33 takes place by sliding the wheelhead table 31 along the bar 25 (FIG. 2) and this longitudinal motion is produced by use of the TABLE cylinder 49 in FIG. 3 and the OSCILLATOR motor 38. When the operator starts up the machine, the wheelhead motor 34 is energized and rotates the abrasive wheel 63 in the usual way. The dresser 42 at the beginning of the cycle is normally in "raised" position and is lowered on occasion by the cylinder 44. In the preferred embodiment, the dresser is a rotatable dressing wheel 64 studded with diamonds, which wheel is rotated by the DRESSER motor 41. Loading of the workpiece takes place, of course, by means of the LOADING ARM cylinder 52 and the SHUTTLE cylinder 53 and takes place through the loading mechanism 15. The operator sets the digital switches and other controls on the face of the door 62 which forms part of the main control 13. The crossfeed movement between the wheel 63 and the workpiece 43, as well as relative to the dresser 42, takes place by presenting negative and positive pulses to the stepping motor 22, so that it moves the bar 26 up and down along the line C—C of FIG. 2. This movement, in turn, produces a singing movement of the wheelhead 33 and of the abrasive wheel 63 carried thereby in a shallow arc, which is substantially a horizontal transverse movement.

Figure 5:
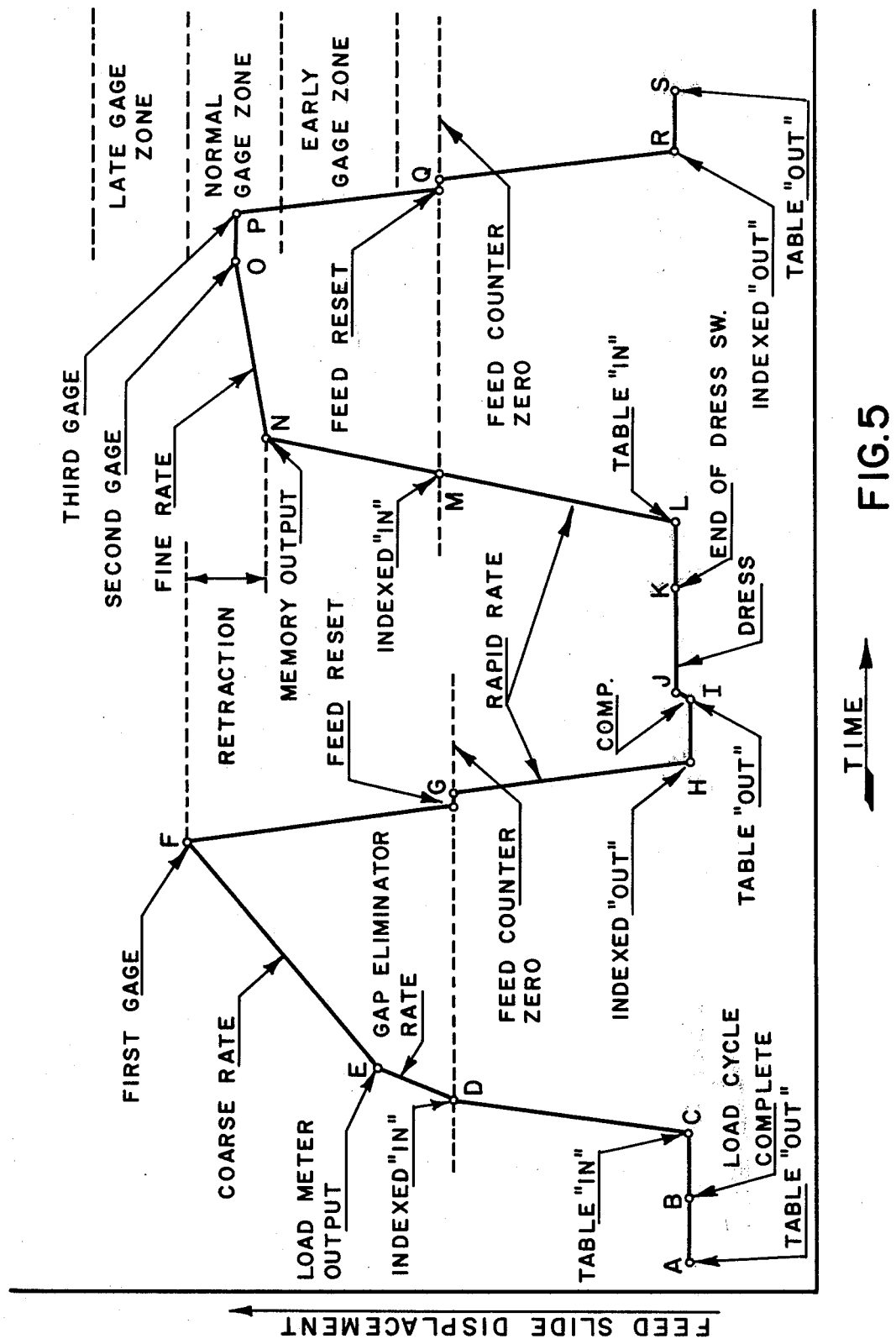
FIG. 5 is a diagrammatic view of a typical grinding cycle using the present invention.

The operation of the grinding cycle will be explained in connection with FIG. 5. With the table 31 and the wheelhead 33 at an extreme right-hand position away from the workpiece 43, the cycle begins at the point A.

The wheelhead is moved longitudinally inwardly and, when loading of the new workpiece has been completed, the wheelhead has reached the point B. At the point C the longitudinal motion ceases and pulses are presented to the stepping motor 22 to cause the wheelhead to move rearwardly of the machine toward the surface 65 of the workpiece. It does so at a very rapid rate until a point D is reached. A slower rate of movement of the wheel toward the workpiece begins with a conventional load meter measuring the current passing to the wheelhead. When the wheel makes contact with the surface 65 of the workpiece, the current on the wheelhead motor rises suddenly and the load meter operates in the well-known manner to cause a shift in feed rate to a slower value. In this case, a coarse feed rate is selected wherein the pulses presented to the stepping motor 22 are at a relatively slow rate compared to the rate of motion from the point C to the point D and from the point D to the point E. Grinding takes place at this slow rate until the gage 47 indicates that a FIRST SIZE has been reached, this taking place at the point F. Reverse pulses are presented to the stepping motor 22 and the wheel backs off at a very rapid rate on a RETRACTION movement to the point G. Pulses continue to be presented to the stepping motor to cause it to move further forward of the workpiece surface 65 unitl the point H is reached. The table 25 is then moved longitudinally by the TABLE cylinder 49 and then is moved rearwardly on a COMPENSATION movement from the point I to the point J. At that time the TABLE cylinder moves the table and the wheelhead inwardly again to the left so that the wheel passes over the dresser 42, which in the meanwhile has been moved into operative position by the cylinder 44. The DRESSER motor 41 rotates the dresser wheel in the usual way. As the wheel passes over the dresser element 64, a small amount of the surface of the wheel is removed to renew the surface to make it "sharp".

The dress is completed by the time the point K has been reached and, at the point L, the grinding wheel 65 lies entirely within the bore of the workpiece, that is to say, is co-extensive with the surface 65. At that time, pulses are presented to the stepping motor 22 to advance it toward the workpiece surface at a rapid rate. The number of pulses is determined by the count in the counter 166, as adjusted by the amount of the count in the DRESS CLEARANCE counter 66. Feed takes place to the point M, at which time the count in the counter 219 in FIG. 14 takes over and determines the amount of movement of the wheelhead toward the workpiece from that point on for a grinding portion of the cycle. The rapid rate pulses continue to be presented to the stepping motor 22, so that the wheelhead advances still further at which time the memory output causes the rate of pulses to be switched over to a fine rate of feed, this taking place at the point N. The fine or FINISH RATE feeding takes place from the point N to the point O, at which time the gage 47 indicates that a SECOND PREDETERMINED SIZE has been reached in the workpiece. From the point O to the final point P, the grinding takes place by "spark-out" in which the deflection in the spindle on which the grinding wheel is mounted serves as the only mechanism for advancing the wheel toward the workpiece. The gage indicates that the third and FINAL SIZE has been reached and it acts to present reverse movement pulses to the stepping motor 22 to move the wheel away from the finished workpiece surface. The measuring mechanism indicates whether the point P has been reached during a NORMAL GAGE ZONE, or whether the point P lies in a LATE GAGE ZONE, the nature of this location of the final point P determining the presence of a signal on the lines 91 or 92 or the entire absence thereof. If the point P is reached in the EARLY GAGE ZONE, this means that the diamond 64 is worn, so that, when the grinding wheel is dressed, it dresses the wheel too large. In order to overcome this, it is necessary to change the amount of the DRESS CLEARANCE to make it larger, so that the wheel (when dressed) will not reach final size until a later time and so that the point P appears in the NORMAL GAGE ZONE. If, on the other hand, the point P appears in the LATE GAGE ZONE, it is indication that thermal changes or the like have taken place in the machine and that the diamond is located too far toward the front of the machine. It is then necessary to send a signal on the line 92 to substract from the count in the DRESS CLEARANCE counter 66 and to compensate for this discrepancy from standard conditions.

It can be seen, then, that since the DIAMOND CLEARANCE dimension determines when the points D, G, and M are reached. Wear and thermal changes in the location of the operative surface of the dresser can, on the one hand, cause the rapid infeed to be slowed too early in the cyle (in which case machine time is wasted) or it can be reached too late in the cycle in which case the grinding wheel is likely to be damaged by rough contact at high speed with the surface of the workpiece.

The present invention makes it possible also to set the ROUGH RATE and the FINISH RATE by means of the digital switches 168 and 169 in such a way that the frequency of the pulses, as presented to the stepping motor 22, is in exact accordance with the count showing on the digiswitch. It is not necessary to calibrate the digiswitch, but the exact readout on the digiswitch can be used to determine the frequency. This is because the linear resistance control clock 167 gives a frequency of pulses that bears a straight line relationship to the settings on the switches 168 and 169. This is all accomplished by the operation of the circuitry shown in FIG. 17 and the voltage-to-frequency converter 257. The operational amplifier 258, as has been stated, serves to stop the machine if an electrical open circuit takes place in the rate setting circuitry which includes the digiswitches 168 and 169. It should be pointed out that the position of the wheelhead relative to the point D and M is always indicated on the face of the main control 13 and its position is determined by the counter 219 in FIG. 14. The pulses that take place in the parts of the cycle below the level of these points (forward of the workpiece surface) is carried in the counter 166 and constitutes the "DIAMOND CLEARANCE", as has been described above. The use of the present invention means, therefore, that, irrespective of the physical location of the points D and M, the readout on the feed counter 219 is zero at that point, so that the operator need not be concerned with the fact that the internal construction of the machine provides the compensation for the diamond wear and like variations in diamond surface location.

The advantages of the present invention will now be readily understood in view of the above description. With this invention it is possible to use the commercially-available digi-switches for setting the feed rate and, at the same time, be assured that the setting on these switches produces an accurate rate of feed. Since the digiswitch presents discrete amounts of resistance, the amounts depending on the setting and the showing of the switches, it is desirable (but was not available in the prior art devices) to have the rate be actually commensurate with that setting. This has been accomplished by the present invention. In other words, the rate of feed is controlled in the present device by means of an external resistance which can be set by the operator on the face of the main control and this rate is directly proportional to the value of the resistance thus set. In a commercial version of the machine, the board was set in such a way that a resistance change of 10 ohms resulted in a change in the pulsing rate of 1 hz. The range of the pulsing circuit was from 1 hz. to 1,000 hz. with a change in resistance from 10 ohms to 10,000 ohms. In connection with the DIAMOND CLEARANCE counter system, the commercial version of the invention was provided with a commercial three-digit, bi-directional electro-mechanical counter with an electrical readout of each digit. A diode board was attached to this counter in order to convert the ten-line three-digit readout to a three-digit BCD readout. Two additional circuit boards required for this system plugged into the main control printed circuit board rack. These two boards were the DIAMOND INDEX LOGIC board and the COUNTER CONTROL board. The main purpose of the electro-mechanical counter is to provide something that will accept signals and compensate for "drift" due to diamond wear, thermal effects, and the like. These signals came from a standard feedback circuit which used an "EARLY GAGE" or a "LATE GAGE" signal to indicate drift. On other types of machines an after-gage system might be used to provide this feedback signal.

The counter, incidentally, also gives a visual indication of the clearance between the diamond point and the surface of the unground workpiece. This indication is a three-digit decimal readout, each digit having a value of 0.0001 inches on the diameter. In the commercial version of the machine, this means that a counter setting of "100" will indicate a diamond clearance of 0.010 inches on diameter (0.005 inches actual). The electrical readout of this counter is used in much the same manner as a three-digit thumb-wheel switch. It presets a number on a downcounter to index the wheel to and from the work. At the start of the grinding cycle, the wheel is indexed toward the work by a number of pulses equal to the counter setting. This index is not displayed on the digitial readout of the feed, as has been stated above, but is indicated by an "INDEXED IN" lamp 130 when the index has been completed (at the point O or the point M). At this time the wheel is further advanced toward the work at a rapid rate until the load meter signal is obtained. The load meter contact changes this rapid rate to the rough grinding rate and the grinding cycle continues in the same way as with any standard stepping motor feed grinding machine.

All of the feed which takes place from the "INDEXED IN" position (point D) is displayed on the digital readout of the feed on the face of the main control 13, so that the operator can see it. When "final size" is reached, the feed is first reset to zero, which will be indicated on the digital readout. Once the feed reaches zero, the wheel is "indexed out" again by the amount of pulses equal to the electro-mechanical counter setting. This position is indicated by a FEED AND INDEXED RESET light 129. A relay is also energized at this time and its contacts are used for cycle sequencing. From this description, it can be seen that the total in-feed of the grinding wheel consists of two separate motions of the stepping motor. These are first the "index" (which is not displayed on the feed readout) but does accept feedback. The second is the standard feed that does display on the readout and has electrical outputs at preset positions. It can be seen that the overall system can be thought of as a standard stepping motor feed with a digital type of zero shift. This "zero shift" can be controlled from both internal and external in-put signals.

Another important feature of the present invention, is that it will stop the machine when a "DIAMOND WORN" signal is generated. This signal is automatically produced when the wheel is indexed "in" or "out" and the electro-mechanical counter is below "010", which is 0.001 inches on diameter. The cycle will stop at the end of the grinding cycle and a light will signal the operator that the diamond is worn. At this time, the operator will remove the diamond and inspect it. He will decide whether the diamond should be replaced or readjusted. In either case, the operator will switch the diamond clearance counter to the "SET-UP MODE" using a three-position selector switch. Next, using the larger-smaller spring return-to-center in the selector switch, the operator will hold the switch in the larger position. The diamond clearance counter will now receive impulses at a rate of approximately 8 hz. on the "ADD" coil 67. Each ADD impulse will retract the wheel one step or 0.001 inches on diameter by means of the stepping motor. When the operator reaches the desired diamond clearance on the counter, he will release the selector switch, thus stopping both the counter and the grinding wheel. If he goes beyond his desired position, he can reverse the counter and the wheel by actuating the spring return switch in the opposite direction. Once this position has been reached, the operator will install a new diamond or replace the old diamond. It would be adjusted manually at time in such a way that the operative dresser surface just touches the grinding wheel. Once the grinding cycle has been restarted, the feedback signals may shift the counter in one direction or the other. This would be the case if the operator was not too accurate in his adjustment of the diamond.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine for generating a surface of revolution on a workpiece, comprising:
  a. a base,
  b. a workhead and a wheelhead mounted on the base for relative movement transversely of the axis of the surface of revolution,
  c. a stepping motor operative to produce the said relative movement in response to receipt of electrical pulses,
  d. a pulse generator connected to the stepping motor to supply the said electrical pulses, the generator including a resistance unit connected to control the frequency of the pulses, the unit including an actuator movable in increments to connect equal increments of resistance to the generator, the said increments of resistance producing equal increments of frequency of pulses, and e. a circuit that reduces the pulse frequency to zero when an open circuit occurs in the resistance unit.

2. A grinding machine as recited in claim 1, wherein a straight-line relationship exists between the resistance in the resistance unit and the frequency of pulses emitted by the pulse generator.

3. A grinding machine as recited in claim 1, wherein the resistances in the resistance unit are selected by settings of a plurality of thumb-wheel digital switches associated with a plurality of fixed resistances.

* * * * *